United States Patent
Cheong et al.

(10) Patent No.: US 7,057,999 B2
(45) Date of Patent: Jun. 6, 2006

(54) OPTICAL HEAD FOR NEAR-FIELD RECORDING AND REPRODUCTION, AND METHOD OF MANUFACTURING THE SAME

(75) Inventors: Young-min Cheong, Seoul (KR); Jeong-kwan Lee, Anyang (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1028 days.

(21) Appl. No.: 09/764,158

(22) Filed: Jan. 19, 2001

(65) Prior Publication Data

US 2001/0030928 A1 Oct. 18, 2001

(30) Foreign Application Priority Data

Jan. 20, 2000 (KR) .......................................... 2000-2602

(51) Int. Cl.
*G11B 7/00* (2006.01)

(52) U.S. Cl. ................ 369/121; 369/112.01; 369/44.23

(58) Field of Classification Search ................. 369/121, 369/112.01, 112.07, 44.23, 112.05, 112.06, 369/44.14, 44.24, 44.37, 120, 118, 94
See application file for complete search history.

(56) References Cited

U.S. PATENT DOCUMENTS

| | | | | |
|---|---|---|---|---|
| 5,933,402 A | * | 8/1999 | Lee et al. ................ | 369/121 |
| 6,023,450 A | * | 2/2000 | Park et al. ............... | 369/121 |
| 6,056,448 A | * | 5/2000 | Sauter et al. ............ | 385/92 |
| 6,084,848 A | * | 7/2000 | Goto ....................... | 369/121 |
| 6,611,487 B1 | * | 8/2003 | Shimano et al. ........ | 369/112.01 |
| 6,670,599 B1 | * | 12/2003 | Wagner et al. .......... | 250/214.1 |

FOREIGN PATENT DOCUMENTS

| | | |
|---|---|---|
| JP | 60-79539 | 5/1985 |
| JP | 6-25410 | 9/1994 |
| JP | 11-328717 | 11/1999 |
| WO | 96/27880 | 9/1996 |

* cited by examiner

*Primary Examiner*—Ali Neyzari
(74) *Attorney, Agent, or Firm*—Stein, McEwen & Bui, LLP

(57) ABSTRACT

An optical head for near-field recording and reproduction, and a method of manufacturing the optical head. A vertical cavity surface emitting laser (VCSEL) and a photodetector are formed on a slider, and a lens layer, an optical path control layer and/or a coil member are directly formed over the VCSEL and the photodetector by thin film deposition. Combining the optical system for information recording and reproduction with the slider reduces the size of the optical head compared with an optical head adopting a slider and a large optical system which are separated from each other. As a result, dynamic characteristics of the optical head improve, thereby reducing the time required for searching for a target track. Thus, the optical head is suitable for a micro information recording and reproducing system.

55 Claims, 14 Drawing Sheets

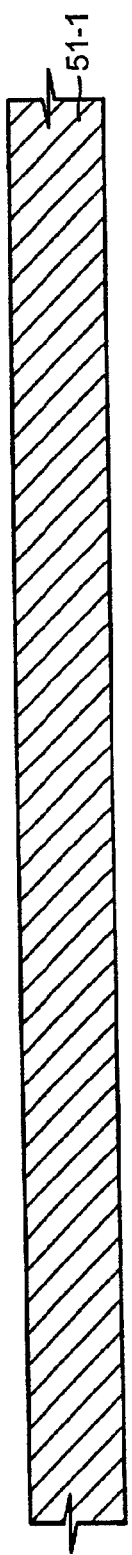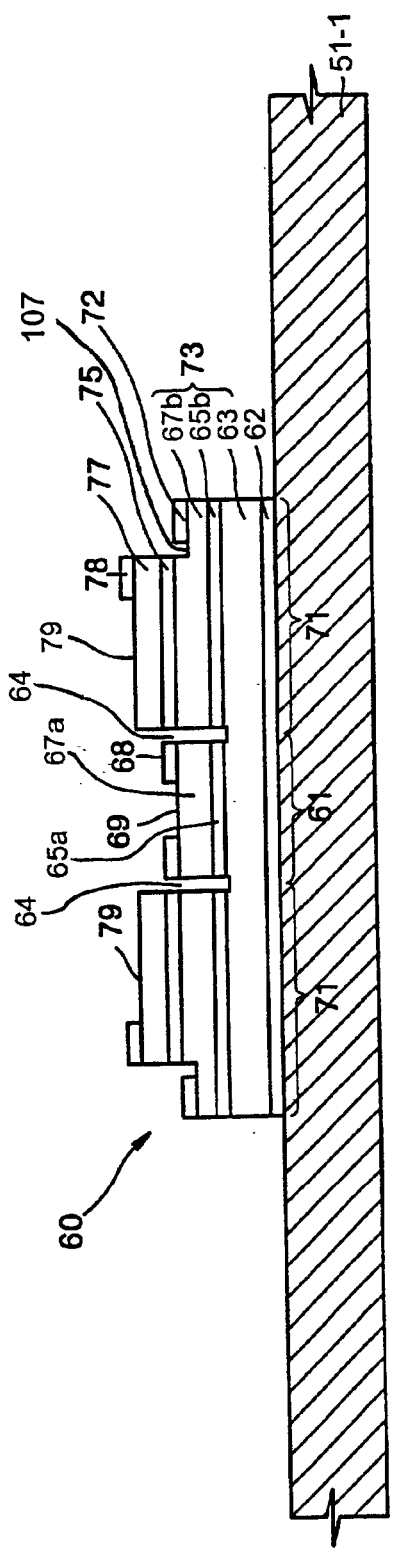

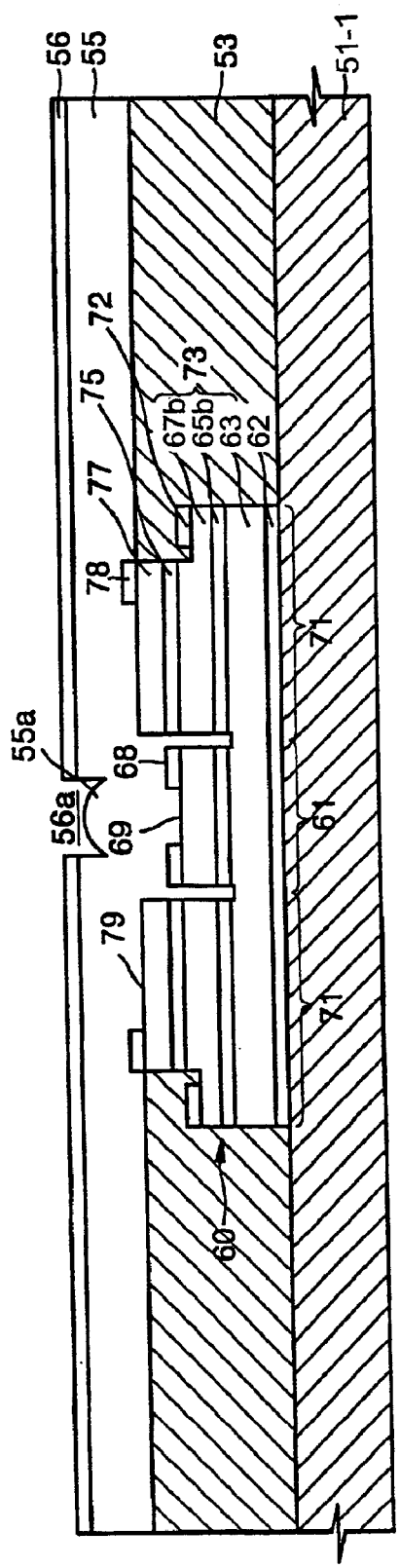
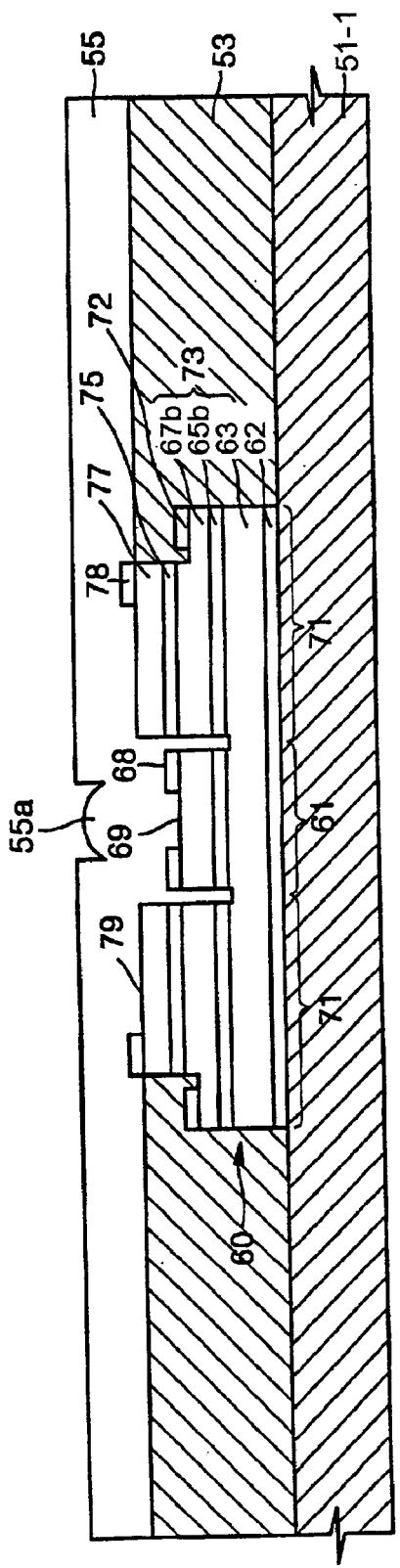

OPTICAL HEAD FOR NEAR-FIELD RECORDING AND REPRODUCTION, AND METHOD OF MANUFACTURING THE SAME

CROSS-REFERENCE TO RELATED APPLICATIONS

This application claims the benefit of Korean Application No. 00-2602 filed Jan. 20, 2000, in the Korean Patent Office, the disclosure of which is incorporated herein by reference.

BACKGROUND OF THE INVENTION

1. Field of the Invention

The present invention relates to a miniature optical head for near-field recording and reproduction, in which a vertical cavity surface emitting laser (VCSEL) and a photodetector are integrated on a slider and optical elements for recording and reproduction are formed over the VCSEL and the photodetector by thin film deposition, and a method of manufacturing the optical head.

2. Description of the Related Art

Magneto-optical recording and reproduction systems, which have a higher recording density than magnetic recording and reproduction systems, such as hard disk drives (HDDs), record information onto magneto-optical recording media by magnetic field modulation, and optically reproduce written information from the media, wherein the magnetic field modulation occurs as the magneto-optical recording media lose magnetism at a temperature higher than the Curie point temperature by radiation of a laser beam from a light source.

Referring to FIG. 1, a common swing arm type of a magneto-optical recording and reproducing system is shown. The magneto-optical recording and reproducing system includes an optical system having optical elements which emit light and receive light reflected from an optical disk 1, a swing arm 21 mounted to enable the arm to pivot relative to a base 10, an actuator 23 which provides a rotating driving force to the swing arm 21, and an optical head 30 mounted at the swing arm 21. The optical disk 1 includes a phase change optical disk, which records and reproduces information by phase change caused by light, and a magneto-optical disk, which records information by magnetic field modulation and reproduces information using light.

As shown in FIGS. 2 and 3, the optical head 30 includes a slider 25 having a sliding portion 25a, which is attached at a suspension (not shown) flexibly extending from the swing arm 21 of FIG. 1, such that it is able to scan the tracks of a magneto-optical disk 1—1 while the sliding portion 25a hovers on air a predetermined distance above the magneto-optical disk 1—1 by dynamic air pressure. An objective lens 31 is installed in the slider 25 to focus incident light to form a light spot on the magneto-optical disk 1—1 to reproduce information therefrom. Coils 37 and 39 provide magnetic field modulation.

The coils 37 and 39 are located between the objective lens 31 and the magneto-optical disk 1—1, and are wound around a pair of magnetic poles 33 and 35 in opposite directions. The magnetic poles 33 and 35 are attached to a surface of the slider 25. The magnetic poles 33 and 35 are parallel to each other and separated by a predetermined distance to allow the passing of light which is focused by the objective lens 31. Information is recorded on the magneto-optical disk 1—1 by horizontal magnetic fields according to the direction of current applied to the coils 37 and 39.

In the optical head 30, having the structure in which the coils 37 and 39 are wound around the magnetic poles 33 and 35 arranged in the horizontal direction below the objective lens 31, there is a limitation in reducing the size. In addition, writing by horizontal magnetic fields lowers the recording efficiency and other performances in near-field recording. Furthermore, winding the coils 37 and 39 around the magnetic poles 33 and 35 is ineffective in terms of assembling characteristics, costs and yields, thereby making mass production thereof difficult.

FIG. 4 illustrates another conventional optical head, which is improved from the structure shown in FIGS. 2 and 3. The slider 25 has a projection 46 with a higher refractive index than the refractive index of air, at the side facing a magneto-optical disk (not shown). A coil 43 having an aperture, which allows passing of light focused by the objective lens 31, receives the projection 46 through the aperture and is attached to the side of the slider which faces the magneto-optical disk. The height of the projection 46 corresponds to the height of the coil 43.

The optical head shown in FIG. 4 is smaller than the optical head shown in FIGS. 2 and 3, and has a higher recording density because it records information by a vertical magnetic field. A disadvantage of the optical head shown in FIG. 4 is in that the coil 43 is attached after the projection 46 is formed in the slider 25, thereby lowering assembling efficiency. Manufacturing a smaller projection is also difficult.

In the conventional optical heads shown in FIGS. 2 through 4, the optical system for emitting light and receiving light reflected from an optical disk is mounted on the actuator, or is separated from the optical heads, thereby increasing the size of the entire recording and writing system. In addition, the structure thereof and the manufacturing process therefor become complicated.

SUMMARY OF THE INVENTION

To solve the above problems, it is an object of the present invention to provide an optical head for near-field recording and reproduction with a simple structure, and a method of manufacturing the same, in which a vertical cavity surface emitting laser (VCSEL) and a photodetector are integrated on a slider, and an optical system for recording and reproduction is formed over the VCSEL and the photodetector by thin film deposition, thereby reducing the size and simplifying the assembling process.

Additional objects and advantages of the invention will be set forth in part in the description which follows, and, in part, will be obvious from the description, or may be learned by practice of the invention.

According to an aspect of the present invention, an optical head for near-field recording and reproduction, comprises: a slider hovering above a recording medium by air dynamic pressure; a light device module formed on a surface of the slider which faces the recording medium, the light device module including a vertical cavity surface emitting laser (VCSEL) which emits light in the direction in which the semiconductor material layers thereof are stacked, and a photodetector which receives light which has been emitted from the VCSEL and reflected by the recording medium. A first lens layer is deposited on the light device module using a transparent material, the first lens layer having a first lens which condenses incident light at a portion corresponding to a light emitting portion of the VCSEL. An optical path control layer having a hologram at the center thereof controls the traveling path of incident light, such that light incident from the VCSEL through the first lens layer travels toward the recording medium, and light incident after having been reflected by the recording medium travels toward the photodetector. The VCSEL is a stack of semiconductor material layers including a doped first distributed Bragg reflector (DBR) formed by alternately stacking semiconductor materials having different refractive indexes, an active layer formed on the first DBR, and a second DBR formed on the active layer. The second DBR is also formed by alternatively stacking semiconductor materials having different refractive indexes and is doped with a dopant type opposite the dopant type of the first DBR. The VCSEL emits light through a window in the second DBR.

Preferably, the hologram of the optical path control layer has a concentric pattern, and the photodetector has an annular shape, which surrounds the VCSEL, and is formed in combination with the VCSEL. Alternatively, the hologram of the optical path control layer has a stripe pattern, and the photodetector is arranged at one side of the VCSEL.

The first lens of the first lens layer is formed to have a predetermined curvature, preferably by diffusion-limited etching.

The optical head further comprises a second lens layer formed of a material having a relative high refractive index at the side of the optical control layer, facing the recording medium, the second lens layer having a second lens which condenses incident light.

Where the optical head is adapted to record information on the recording medium by magnetic field modulation and optically reproduce information from the recording medium, the optical head further comprises a coil member formed on the first lens layer, the coil member including at lease one coil layer, preferably having a spiral structure, and an insulating layer formed of a transparent material to allow transmission of light through the center of the coil member. The insulating material protects the coil layer and electrically insulates the adjacent portions of the coil layer.

Preferably, the hologram of the optical path control layer is a polarization hologram having a high transmittance with respect to light polarized in a first direction and a high diffraction efficiency with respect to light polarized in a second direction, and the optical path control layer further comprises a polarization changing layer at a side of the optical path control layer which faces the recording medium, which changes the polarization of incident light.

According to another aspect of the present invention, there is provided a method of manufacturing an optical head for near-field recording and reproduction, comprising: preparing a substrate; forming a light device module on the substrate, the light device module having a vertical cavity surface emitting laser (VCSEL) which emits light in the stack direction of the semiconductor material layers thereof, and a photodetector which receives light incident after having been emitted from the VCSEL and reflected by the recording medium; forming a first lens layer by depositing a light transmitting material over the light device module, the first lens layer having a first lens, which condenses incident light, at a portion corresponding to a light emitting portion of the VCSEL; and forming an optical path control layer having a hologram at the center thereof, to transmit light incident from the VCSEL through the first lens layer toward the recording medium, and to transmit light incident after having been reflected from the recording medium toward the photodetector.

Preferably, forming the first lens layer having the first lens comprises: depositing the first lens layer over the light device module using a transparent material capable of transmitting light emitted from the VCSEL; forming an etching mask having an opening over the first lens layer, the opening being at a portion corresponding to the light emitting portion of the VCSEL; immersing the first lens layer with the etching mask in a chemical etching solution, such that a portion of the fist lens layer exposed through the opening is etched by diffusion-limited etching, thereby resulting in the first lens with curvature; and removing the etching mask.

Preferably, the method further comprises forming a coil member over the first lens layer, the coil member including at least one coil layer with a spiral structure, and an insulating layer formed of a transparent material to allow transmission of light through the center of the coil member. The insulating material protects the coil layer and electrically insulates the adjacent portions of the coil layer.

Preferably, the hologram of the optical path control layer is a polarization hologram and the optical head manufacturing method further comprises forming a polarization converting layer at the side of the optical path control layer, which faces the recording medium, to change the polarization of incident light.

Preferably, the optical head manufacturing method further comprises: forming an etching mask having a relatively small opening over the coil member, such that the center of the insulating layer is exposed through the opening; etching the portion of the insulating layer exposed through the opening to form a second lens having curvature; removing the etching mask; and forming a second lens layer over the insulating layer using a material having a relatively higher refractive index than the refractive index of the insulating layer.

BRIEF DESCRIPTION OF THE DRAWINGS

The above object and advantages of the present invention will become more apparent by describing in detail preferred embodiments thereof with reference to the attached drawings in which:

FIG. 8 is a section view of a blank slider which receives the present invention;

FIG. 9 illustrates forming a light device module on the slider of FIG. 8;

FIG. 11C illustrates etching a micro-lens in the first lens layer;

FIG. 11D illustrates removal of the etching mask shown in FIG. 11B;

DESCRIPTION OF THE PREFERRED EMBODIMENTS

Figure 1:
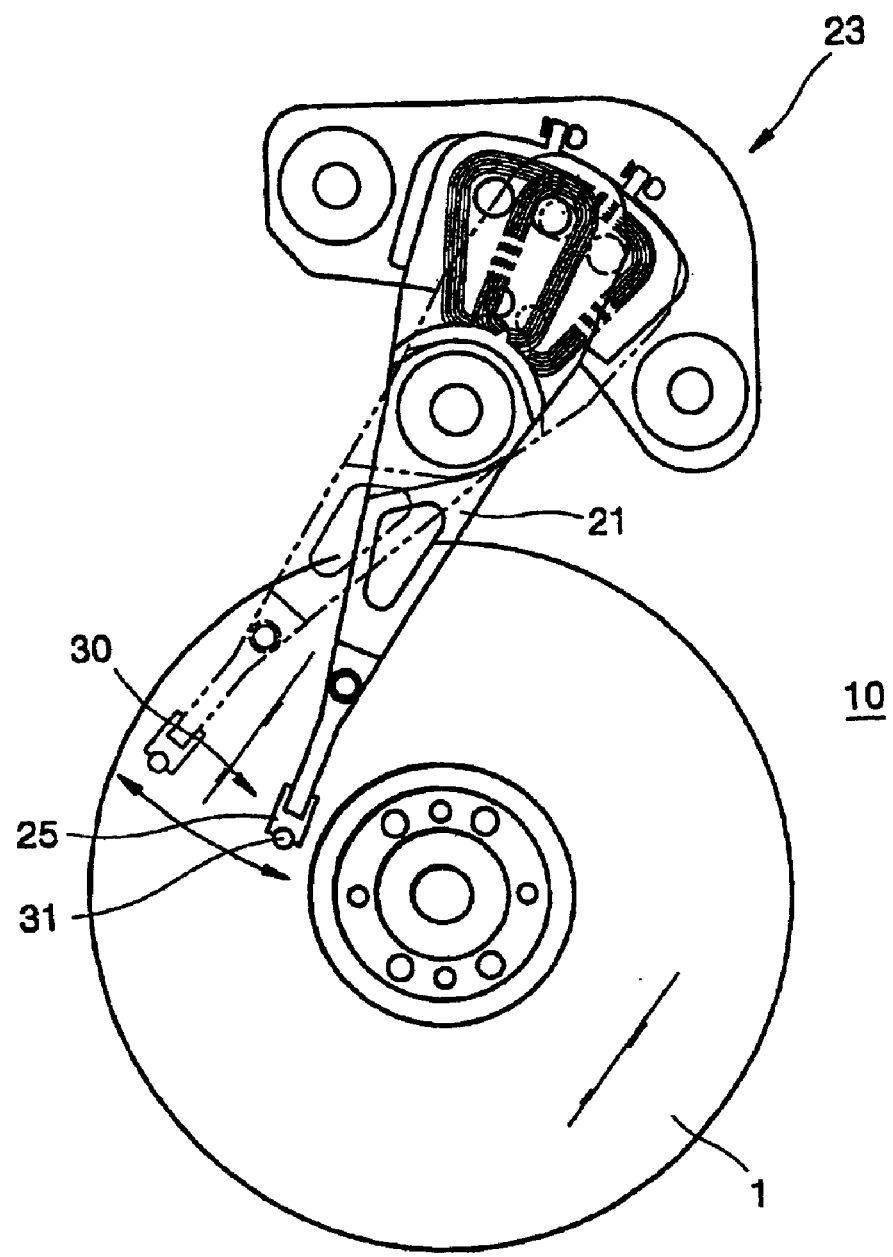
FIG. 1 is a plan view of a common swing arm type of a recording and reproducing system.
Figure 2:
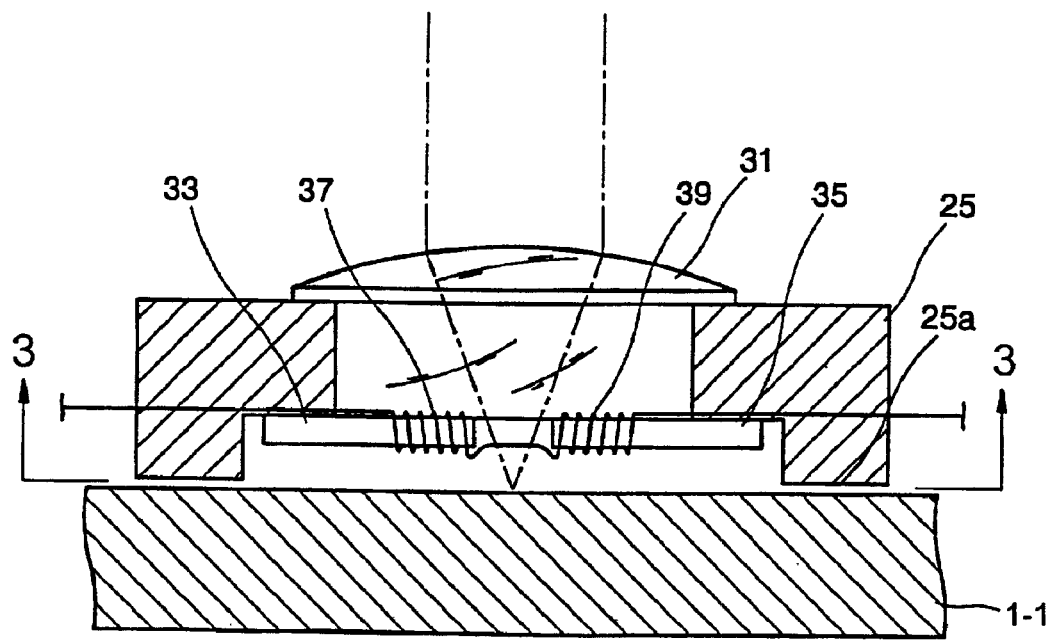
FIG. 2 illustrates an example of a conventional optical head, shown partially in section view.
Figure 3:
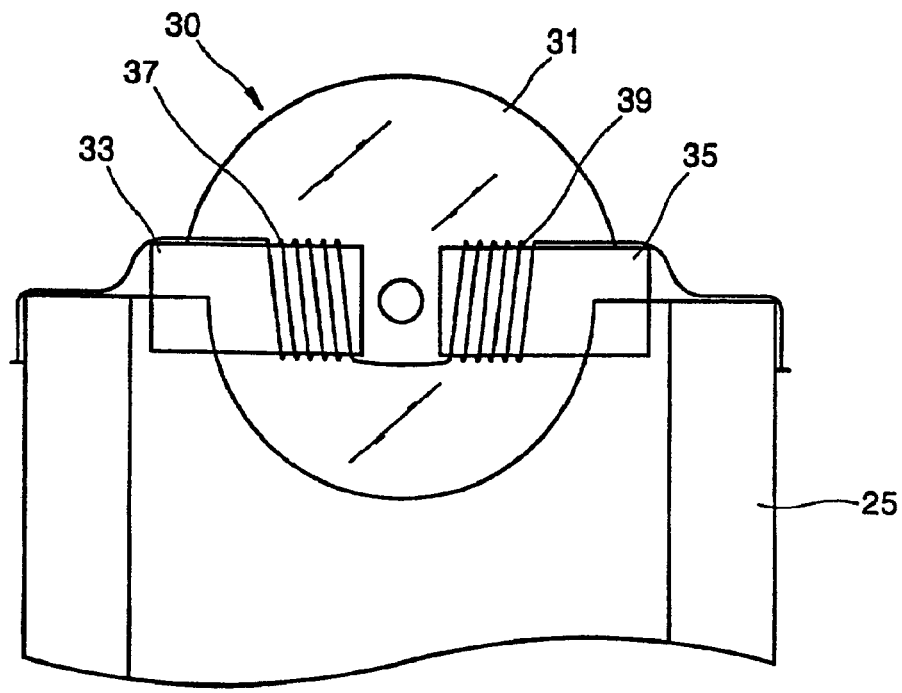
FIG. 3 is a partial bottom view of the optical head shown in FIG. 2, viewed in the direction shown by line 3—3 in FIG. 2.

Reference will now be made in detail to the present embodiments of the present invention, examples of which are illustrated in the accompanying drawings, wherein like reference numerals refer to like elements throughout.

Figure 5:
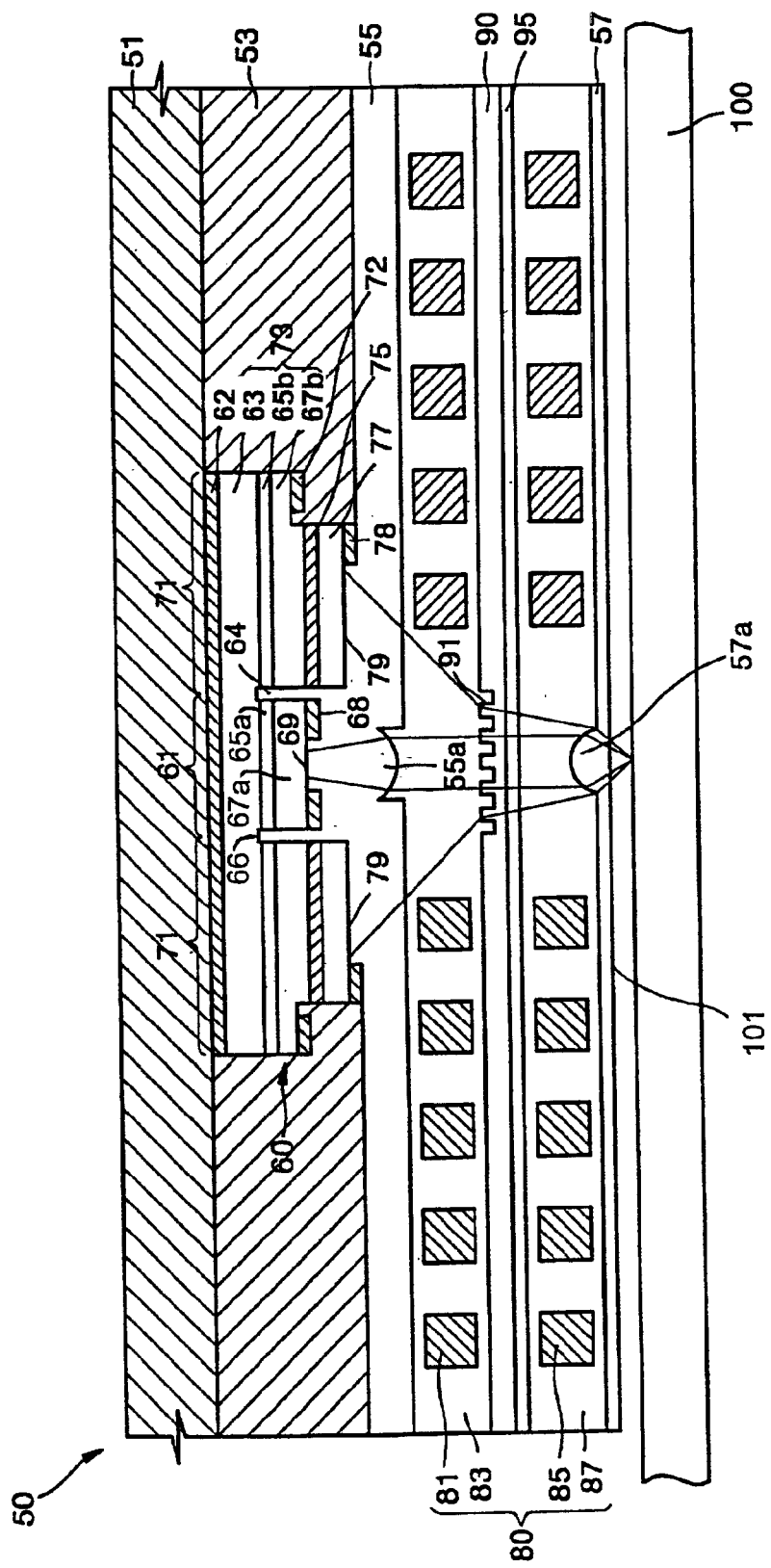
FIG. 5 is a schematic view of an optical head for near-field recording and reproduction according to an embodiment of the present invention.

An embodiment of an optical head for near-field recording and reproduction according to the present invention, which adopts a coil member such that the optical head is enabled to record information on and reproduce information from a magneto-optical recording medium, is shown in FIG. 5. The coil member is not required to record information on and reproduce information from a phase change optical recording medium using light. An optical head 50 includes a slider 51, a light device module 60 formed on a side of the slider 51 which faces a recording medium 100. The light device module 60 emits a laser beam toward the recording medium 100 and receives light reflected from the recording medium 100. A first lens layer 55 having a first micro-lens 55a is deposited on the light device module 60 using a transparent material. An optical path control layer 90 having a hologram 91 at the center thereof changes the traveling path of an incident light beam, and a coil member 80 allows recording of information on the recording medium 100 by magnetic field modulation. The optical head 50 is suitable for use with recording media such as a phase change optical recording medium, which records and reproduces information using light, and a magneto-optical recording medium, which records information by magnetic field modulation and reproduces information using light. Where the optical head 50 is used with phase change optical recording media, the coil member is not electrically driven.

The slider 51 is installed, for example, at a suspension (not shown) extending from the swing arm 21 (see FIG. 1) of a swing arm type magneto-optical recording and reproducing system, and scans the track of the recording medium 100 while hovering on air a predetermined distance above the recording medium 100 by air dynamic pressure generated as the recording medium 100 rotates.

The light device module 60 includes a vertical cavity surface emitting laser (VCSEL) 61 which emits light in the stack direction of semiconductor material layers, and a photodetector 71 combined with the VCSEL 61, which surrounds the VCSEL 61 like a ring. The VCSEL 61 is a stack of semiconductor material layers including a first distributed Bragg reflector (DBR) 63, an active layer 65a and a second DBR 67a, which are stacked in sequence. The VCSEL 61 includes a first electrode 62 between the slider 51 and the first DBR 63, and a second electrode 68 formed on the second DBR 67a, exclusive of a window 69 thereof.

The first DBR 63 is formed by alternately stacking layers of semiconductor materials having different refractive indexes, and is doped with a type of impurity, for example, n-type. The second DBR 67a is formed by alternately stacking layers of semiconductor materials having different refractive indexes, but the second DBR 67a is formed of a relatively small number of layers compared with the number of layers of the first DBR 63. The second DBR 63 is doped with an impurity of a type opposite to the impurity type of the first DBR 63, for example, p-type. The active layer 65a is a region where light is generated by a combination of electrons and holes from the first and second DBRs 63 and 67a, which is induced by current applied from the first and second electrodes 62 and 68.

In the VCSEL 61, light having a wavelength in accordance with the resonant condition between the first and second DBRs 63 and 67a radiates and resonates in the active layer 65a and the light is then emitted through the window 69 defied by the second electrode 68 in the stack direction of the semiconductor material layers, after having passed through the second DBR 67a.

The photodetector 71, which has an annular shape surrounding the VCSEL 61, includes a first semiconductor material layer 73, at least a portion of which is separated by a predetermined distance from the VCSEL 61, second and third semiconductor material layers 75 and 77 deposited on the first semiconductor material layer 73 in sequence, a first detecting electrode 72 formed on a portion of the first semiconductor material layer 73, and a second detecting electrode 78 formed in a predetermined pattern on the third semiconductor material layer 77, exclusive of a light receiving surface 79 of the third semiconductor material layer 77.

The photodetector 71 has a p-i-n structure, in which at least a portion of the first semiconductor material layer 73, adjacent to the second semiconductor material layer 75, is doped with, for example, p-type, and the third semiconductor material layer 77 is doped with, for example, n-type. The second semiconductor material layer 75 is a light absorbing layer which absorbs light incident through the light receiving surface 79.

The first semiconductor material layer 73 of the photodetector 71 has the same stack as the stack of the VCSEL 61. In particular, like the VCSEL 61, the first semiconductor material layer 73 includes a stack corresponding to the first DBR 63, and an active layer 65b and a layer 67b corresponding to the active layer 65a and the second DBR 67a, respectively. Preferably, the active layer 65a is formed together with the active layer 65b and the DBR 67a is formed together with the layer 67b and a trench 64 is formed to separate the active layer 65a and the active layer 65b and to separate the DBR 67a and the layer 67b. Thus, the trench 64 separates the photodetector 71 and the VCSEL 61. The trench 64 is preferably formed by etching the second DBR 67a, the layer 67b, the active layer 65a, the active layer 65b and a portion of the first DBR 63 to a predetermined depth 66. An edge portion of the layer 67b of the first semiconductor material layer 73 is exposed, and the first detecting electrode 72 is formed on the exposed edge portion of the layer 67b.

The current paths for the photodetector 71 and the VCSEL 61 are distinguished from each other by the trench 64 and the active layers 65a and 65b. Current applied from the first and second electrodes 62 and 68 flows through the VCSEL 61, whereas current generated in the second semiconductor material layer 75 by light absorption flows through the first and second detecting electrodes 72 and 78 of the photodetector 71.

For example, the second semiconductor material layer 75 is substantially formed of the same material with the same thickness as the active layer 65a of the VCSEL 61. The third semiconductor material layer 77 is substantially formed of the same material as the first DBR 63, but with a relatively small number of layers relative to the first DBR 63. Thus, the VCSEL 61 and the photodetector 71 of the light device module 60 can be simultaneously formed through the same deposition processes of manufacturing semiconductor devices by applying a stacked semiconductor structure of the VCSEL.

Preferably, the light device module 60 is directly deposited over the slider 51 by a semiconductor device manufacturing processes. Alternatively, a complete light device module 60 can be integrated on the slider 51. A preform having a stack of VCSEL can be used. In particular, the preform having the VCSEL stack is integrated on a slider and etched, and second and third semiconductor material layers for a photodetector are deposited. Next, electrode patterns are formed on the resultant structure, thereby completing the light device module 60.

Figure 6:
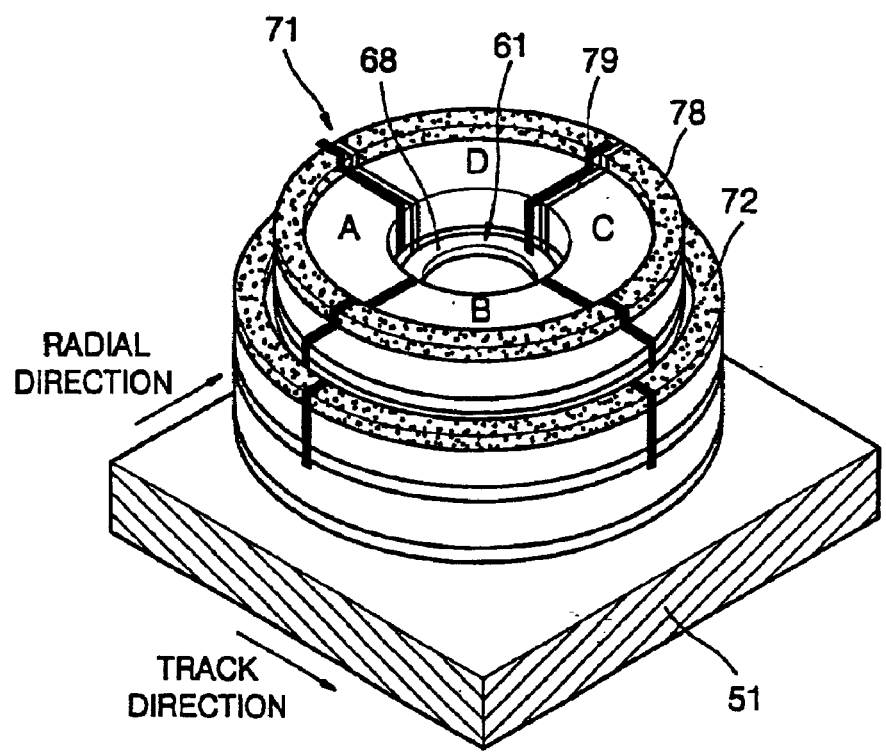
FIG. 6 is an exploded perspective view of the photodetector shown in FIG. 5.

FIG. 6 illustrates an example of the photodetector 71, which is divided into two sections in the track direction of the recording medium 100 to detect an information signal from the recording medium 100 by edge detection. Preferably, the photodetector 71 has four light receiving portions A, B, C and D arranged in a 2×2 matrix, which are obtained by dividing the photodetector 71 into two sections in both the track and radial directions of the recording medium 100, to detect an information signal and a tracking error signal from the recording medium 100. The information signal from the recording medium 100 is detected by subtracting the sum of the signals received by the light receiving portions C and D from the sum of the signals received by the light receiving portions A and B. The tracking error signal is detected by subtracting the sum of the signals received by the light receiving portions B and C from the sum of the signals received by the light receiving portions A and D. Where the optical head 50 according to the present invention is designed exclusively for a phase change optical recording medium, there is no need to divide the photodetector 71 in the track direction of the optical recording medium.

Referring again to FIG. 5, a molded layer 53 surrounds the light device module 60 formed on the slider 51. The molded layer 53 is formed of an insulating material, and serves as a base layer for deposition of the first lens layer 55 and/or the coil member 80 over the light device module 60. The first lens layer 55 is formed on the light device module 60 using a dielectric material which transmits light emitted from the VCSEL 61, and has the first micro-lens 55a, corresponding to the light emitting portion of the VCSEL 61. The first micro-lens 55a focuses the incident beam. The first micro-lens 55a is formed by etching a portion of the first lens layer 55 deposited on the light device module 60, which portion corresponds to the light emitting portion of the VCSEL 61. The first micro-lens 55a is formed to have a convex curvature by diffusion-limited etching using bromine. If the VCSEL 61 is designed to emit 650 or 680 nm light, the first lens layer 55 can be formed of InGaP.

Figure 7:
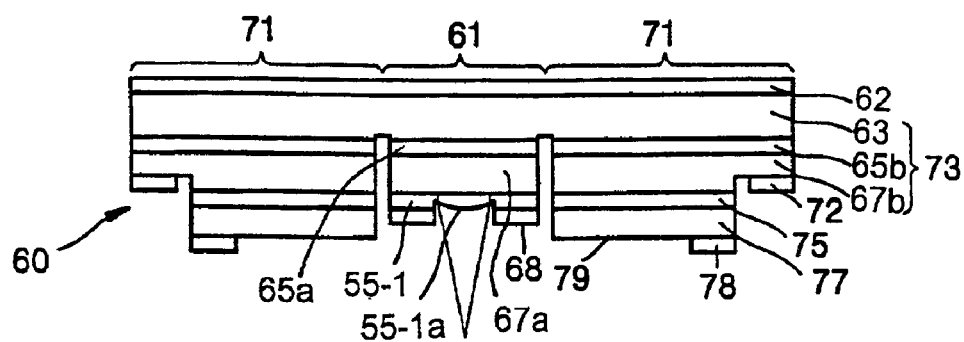
FIG. 7 illustrates another embodiment of the optical head according to the present invention, in which a first lens layer is directly formed on a vertical cavity surface emitting laser (VCSEL)

The first lens layer 55 is formed to cover the entire light device module 60 in FIG. 5. Alternatively, a first lens layer 55-1 is located between the second DBR 67 and the second electrode 68 of the VCSEL 61 and a first micro-lens 55-1a can be directly formed within the window 69 of the VCSEL 61, as shown in FIG. 7.

Referring again to FIG. 5, the optical path control layer 90 is formed of a dielectric material and has the hologram 91 at the center thereof. The hologram 91 has a concentric pattern and diffracts the incident beam reflected from the recording medium 100, such that the incident beams goes towards the annular photodetector 71 surrounding the VCSEL 61. Preferably, the hologram 91 is separated by a predetermined distance from the light device module 60 and the first lens layer 55. Such separation provides a predetermined optical width such that a beam reflected from the recording medium 100 and then diffracted by the hologram 91 is received by the photodetector 71. In the present embodiment, the optical path control layer 90 having the hologram 91 is disposed between two coil layers 81 and 85 of the coil member 80.

Preferably, the hologram 91 is a polarization hologram which selectively transmits and diffracts the incident beam according to the respective polarization components thereof, such that the beam reflected from the recording medium 100 is efficiently diffracted by the polarization hologram. Almost all light emitted from the VCSEL 61 is a linear polarized light having a direction, so that a large amount of the beam reflected from the recording medium 100 is diffracted by the hologram 91 and directed toward the photodetector 71. The polarization hologram 91 has a relatively high transmission and low diffraction efficiency for light polarized in a first direction, and a relatively low transmission and high diffraction efficiency for light polarized in a second direction.

If the polarization hologram 91 is adopted in the optical path control layer 90, a polarization changing layer 95 which changes the polarization of the incident beam is installed at the surface of the optical path control layer 90, which faces the recording medium 100. The polarization changing layer 95 is formed of a material having anisotropic refractivity to a thickness, which is thick enough to induce a phase difference of $\lambda/4$ (where $\lambda$ is the wavelength of light emitted from the VCSEL 61) between two perpendicular linearly polarized beams, such that the polarization changing layer 95 serves as a quarter wave plate.

Given that almost all light emitted from the VCSEL 61 is a p-polarized beam and the polarization hologram 91 has a relatively high transmittance for the p-polarized beam and a relatively high diffraction efficiency for the s-polarized beam, the incident beam from the VCSEL 61 transmits through the polarized hologram 91. The p-polarized beam passed through the polarization hologram 91 is changed to one circular polarized beam by the polarization changing layer 95 and is radiated on the recording medium 100. The one circular polarized beam is changed to the other circular polarized beam when reflected from the recording medium 100, and then to an s-polarized beam by the polarization changing layer 95. Almost all the s-polarized beam is diffracted by the polarization hologram 91, such that the s-polarized beam goes toward the annular photodetector 71 surrounding the VCSEL 61.

As previously mentioned, if both the polarization hologram 91 and the polarization changing layer 95 are adopted as an optical path control means, light detecting efficiency increases because the polarization hologram 91 efficiently diffracts light to the $1^{st}$ order beam than a general non-polarization hologram.

Figure 4:
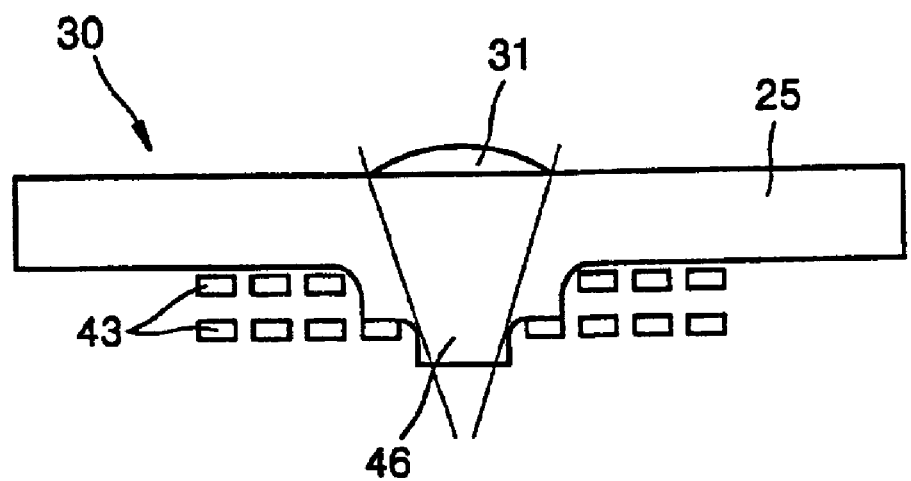
FIG. 4 illustrates another example of a conventional optical head.

The coil member 80 includes at least one coil layer having a spiral structure, for example, stacked coil layers 81 and 85, and insulating layers 83 and 87, which cover and protect the coil layers 81 and 85, respectively, and electrically insulate the adjacent portions of each of the coil layers 81 and 85. Preferably, a plurality of coil layers are formed and the plurality of coil layers are electrically connected in series. The insulating layers 83 and 87 are formed of a polymer, such as polyimide, which transmits light, and the polymer is also spread at the center of the coil member 80. As a result, there is no need to form a mesa structure such as the projection 46 shown in FIG. 4 for transmitting light entering the center of the coil member 80. Where, the optical head is designed so as to record information on and reproduce information from a phase change optical recording medium using light, coil layers 83 and 87 are not required.

Preferably, a second lens layer 57 having a second micro-lens 57a, which is formed of a material having a higher refractive index than the insulating layer 87, is further disposed at the side of the coil member 80, which faces the recording medium 100, such that the second micro-lens 57a corresponds to the light transmitting portion of the VCSEL 61. Preferably, the second lens layer 57 is formed of a material having a high refractive index and excellent durability. For example, the second lens layer 57 is formed of a material having a refractive index of 2.1 or more, such as SiN or $ZnSiO_2$.

The second micro-lens 57a, a solid immersion lens, is formed by isotropically etching the surface of the insulating layer 87, corresponding to the center of the coil member 80, to have a semi-spherical concave curvature, and by depositing the second lens layer 57 with a material having a higher refractive index than the insulating layer 87 over the resultant structure. The second-micro lens 57a further condenses the beam emitted from the VCSEL 61, which has been pre-condensed by the first micro-lens 55a, thereby decreasing the size of a light spot focused on the recording medium 100. As a result, the information recording and reproduction density can be further enhanced compared to the case of using a single condensing lens. The surface 101 of the second lens layer 57 is planarized by a suitable method, such as, for example, polishing. The surface of the second lens layer 57 serves as an air-bearing surface, which enables the optical head 50 including the slider 52 to hover above the recording medium 100 by air dynamic pressure generated as the recording medium 100 rotates. Alternatively, a separate air-bearing plate (not shown) can be attached at the side of the slider 51, facing the recording medium 100.

In operation of the optical head 50 according to the present invention, power is applied to the VCSEL 61 while the optical head 100 hovers on air a predetermined distance above the recording medium 100 by air dynamic pressure generated by rotation of the recording medium 100. Light emitted from the VCSEL 61 through the window 69 is pre-condensed by the first micro-lens 55a formed in the first lens layer 55. The condensed beam transmits through the insulating layers 83 and 87 located at the center of the coil member 80, the optical path control layer 90 and the polarization changing layer 95, and is further condensed by the second micro-lens 57a to form a light spot on the recording medium 100. Light reflected from the recording medium 100 is diffracted by the polarization hologram 91 of the optical path control layer 90 and then detected by the photodetector 71 having the annular shape, which bounds the VCSEL 61.

Where a magneto-optical recording medium, which loses its magnetical properties when the temperature is increased to a temperature higher than the Currie point temperature by the focusing of light on the recording medium, is adopted as the recording medium 100, as power is applied to the coil layers 81 and 85 of the coil member 80 to create a magnetic field, the magnetic properties of the portion of the recording medium 100 irradiated with light change, so that information is written on the recording medium 100. During reproduction of information from the magneto-optical recording medium, light reflected from the magneto-optical recording medium is diffracted by the optical path control layer 90, such that the diffracted beam is received by the photodetector 71. The photodetector 71 detects an information reproduction signal from the received diffracted beam.

Alternatively, the optical head 50 according to the present invention may adopt a phase change optical recording medium as the optical recording medium 100, which records and reproduces information by change of phase using a light signal.

In the manufacture of the optical head 50 shown in FIG. 5 according to the present invention, the light device module 60 and the optical system including the optical path control layer 90 are directly deposited on the slider 51 by thin film deposition, so that the configuration is simple and compact. Thus, the optical head 50 is applicable to a micro information recording and reproducing system.

A method of manufacturing the optical head 50 shown in FIG. 5, in which the VCSEL 61 and the photodetector 71 are directly deposited on the slider 51 through semiconductor manufacturing processes, will be described with reference to FIGS. 8 through 13C. As shown in FIG. 8, a substrate 51-1 to be the slider 51 is prepared. Next, appropriate lead patterns are formed in the substrate 51-1, which allow application of power to the light device module 60 and/or the coil member 80 being formed through subsequent processes.

Following this, as shown in FIG. 9, the light device module 60 including the VCSEL 61 and the annular photodetector 71 surrounding the VCSEL 61 is deposited on the substrate 51-1 by semiconductor manufacturing processes. In particular, the first electrode 62 is formed on the substrate 51-1, and the first DBR 63, the active layers 65a and 65b and the second DBR 67a and the layer 67b are deposited in sequence on the first electrode 62, so that the stack of semiconductor layers for the VCSEL 61 and the first semiconductor material layer 73 of the photodetector 71 are completed. Next, the second semiconductor material layer 75 is deposited on the first semiconductor material layer 73 using substantially the same material as the material used to form the active layer 65a, to have a thickness, which is substantially the same as that of the active layer 65a. The third semiconductor material layer 77 is formed on the second semiconductor material layer 75 using substantially the same material as that used to form the first DBR 63, but is formed of a relatively smaller number of layers than the first DBR 63.

A boundary trench 64 is etched to a depth which extends just into the first DBR 63, to electrically separate the layer 65a from the layer 65b and to separate the second DBR 67a from the layer 67b, thus separating the VCSEL 61 and the photodetector 71. The third and second semiconductor material layers 77 and 75, and the layer 67b are etched to a depth which extends just into the layer 67b, such that the layer 67h is partially exposed at the edge of the photodetector 71, forming a shoulder 107.

Figure 10:
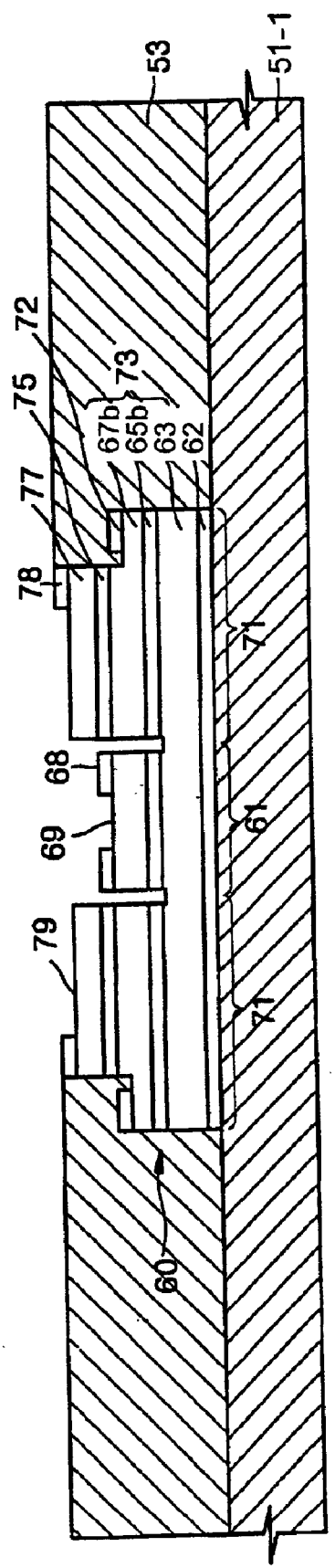
FIG. 10 illustrates forming a molded layer around the light device module illustrated in FIG. 8.

The first detecting electrode 72 is formed at the exposed portion of the layer 67b, and the second detecting electrode 78 is formed on the third semiconductor material layer 77, exclusive of the light receiving surface 79. Also, the second electrode 68 is formed on the second DBR 67a, which is a part of the VCSEL 61, exclusive of the window 69. After the light device module 60 is completed, the periphery of the light device module 60 is molded using an insulating material, thereby forming the molded layer 53, as shown in FIG. 10. The molded layer 53 is a base layer on which the first lens layer 55 or the coil member 80 is deposited by subsequent processes.

Next, the first lens layer 55 having the first micro-lens 55a which focuses the incident beam, which corresponds to the light emitting portion of the VCSEL 61, is formed over the light device module 60 using a material having a high transmittance with respect to the light emitted from the VCSEL 61. This will be described with reference to FIGS. 11A through 11D.

Figure 11A:
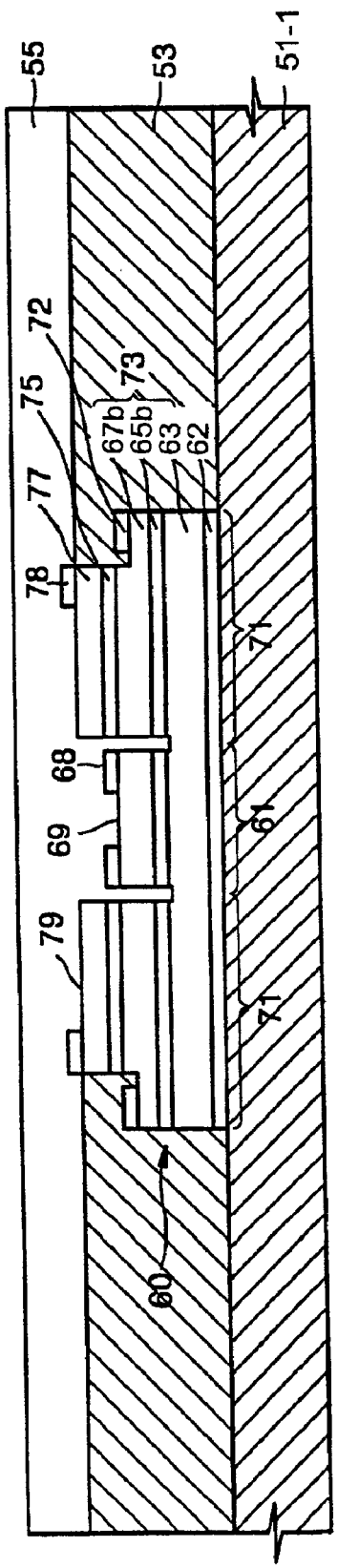
FIG. 11A illustrates forming a first lens layer over the light device module.
Figure 11B:
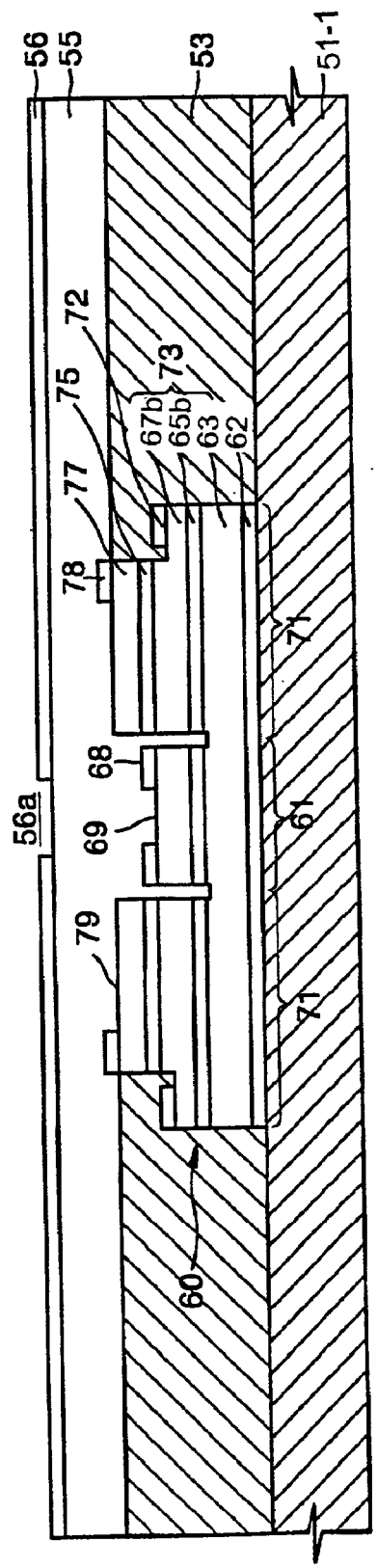
FIG. 11B illustrates depositing an etching mask over the first lens layer.

As shown in FIG. 11A, the first lens layer 55 is deposited over the light device module 60. Following this, as shown in FIG. 11B, an etching mask 56 having an opening 56a, which exposes a portion corresponding to the light emitting portion of the VCSEL 61, is formed over the first lens layer 55, and dipped in a chemical etching solution for a predetermined period of time, so that the portion of the first lens layer 55 exposed through the opening 56a is etched to have a convex curvature by diffusion-limited etching, thereby resulting in the convex first micro-lens 55a, as shown in FIG. 11C. When the formation of the first micro-lens 55a by etching is completed, the etching mask 56 is removed, as shown in FIG. 11D.

Where the VCSEL 61 emits light having a wavelength of about 650 nm or 680 nm, the first lens layer 55 can be formed of InGaP. The etching mask 56 is an insulating layer formed of $Si_3N_4$ or $SiO_2$. A bromine containing solution is used as the chemical etching solution. When the first lens layer 55 with the etching mask 56 is immersed in a bromine containing solution, bromine seeking a target to etch collides with the surface of the first lens layer 55, which is exposed through the opening 56a of the etch mask 56, by diffusion, so that the exposed portion of the first lens layer 55 is etched. Because it is more likely that bromine disappears by etching the edge of the exposed surface of the first lens layer 55 before reaching the center of the exposed surface of the first lens layer 55, the etching depth to the first lens layer 55 is deeper near the periphery of the opening 56a than at the center of the surface of the first lens layer 55 exposed through the opening 56a, which results in the first micro-lens 55a with a convex curvature.

Figure 12:
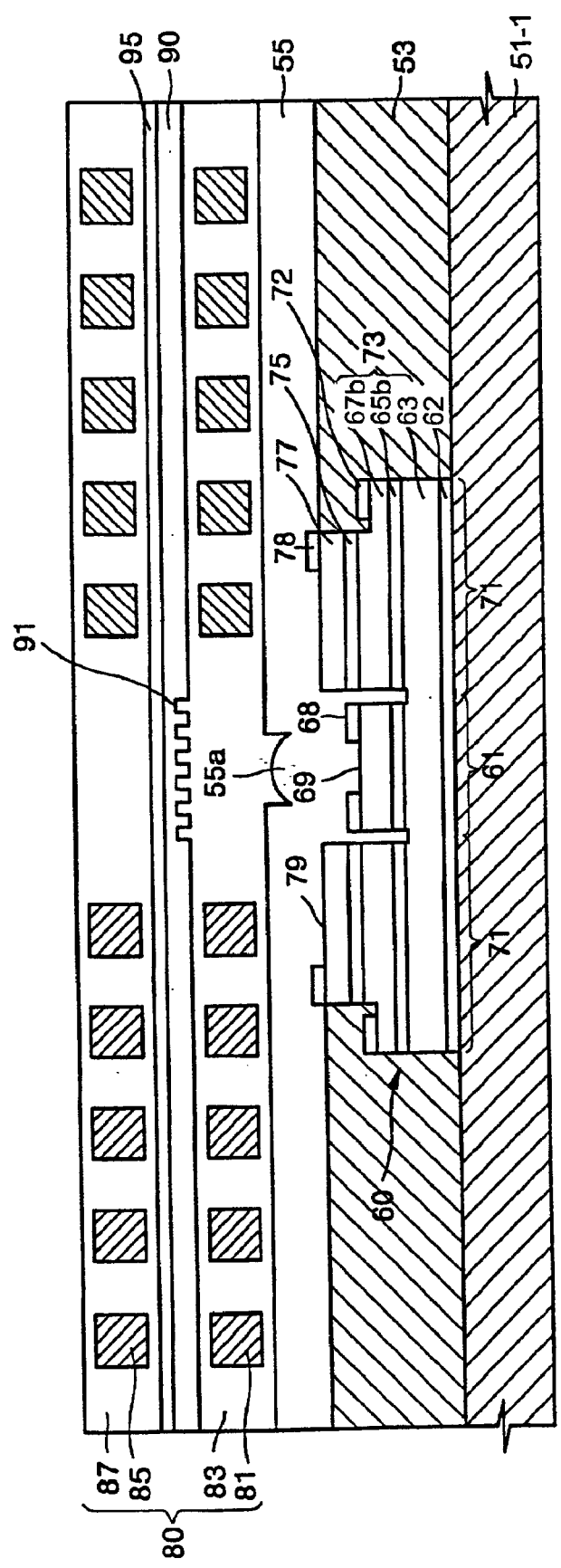
FIG. 12 illustrates forming a coil member having a control layer with a hologram and a polarization layer inserted therein.

Following this, as shown in FIG. 12, the coil member 80 having the stacked first and second coil layers 81 and 85, which have a spiral structure, and the insulating layers 83 and 87 for first and second coil layers 81 and 85 are formed. The optical path control layer 90 having the hologram 91 at a center portion of the coil member 80, through which light transmits, is formed between the first and second coil layers 81 and 85. The insulating layers 83 and 87 of the coil member 80, which cover and protect the first and second coil layers 81 and 85, and electrically insulate the adjacent portions of the first and second coil layers 81 and 85, are formed of a transparent material, for example, a polymer such as polyimide, which allows light entering the center of the first and second coil layers 81 and 85 to pass through.

When the optical path control layer 90 is placed between the first and second coil layers 81 and 85. After forming the first coil layer 81 covered with the insulating layer 83, the optical path control layer 90 is formed, and then the second coil layer 83 covered with the insulating layer 87 is formed over the optical path control layer 90. Where the hologram 91 of the optical path control layer 90 is a polarization hologram, the polarization changing layer 95, which acts as a quarter wave plate, is further deposited on the optical path control layer 90 prior to forming the second coil layer 85.

Figure 13A:
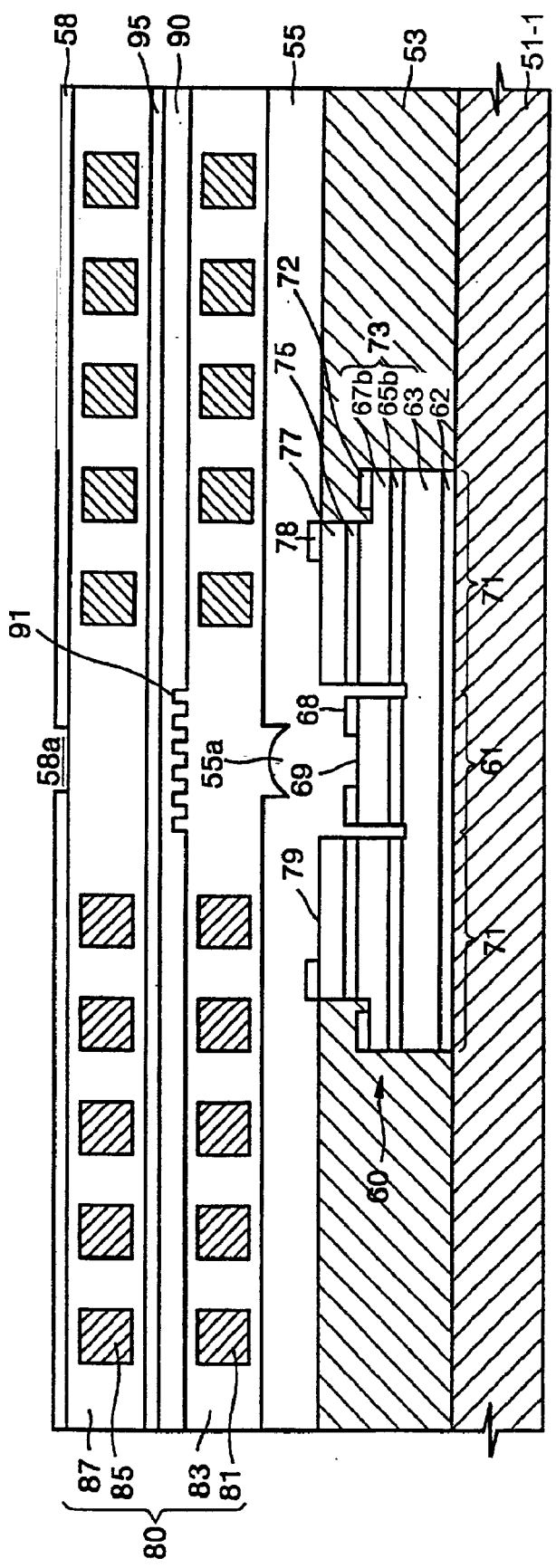
FIG. 13A illustrates forming an etching mask on the coil member.

Following this, the second lens layer 57 having the second micro-lens 57a, which is a solid immersion lens, is formed on the surface of the coil member 80, which faces the recording medium 100. This will be described with reference to FIGS. 13A through 13C. As shown in FIG. 13A, first an etching mask 58 having an opening 58a, which is small enough to apply isotropic etching, is placed on the surface of the coil member 80, which faces the recording medium 100, such that a portion of the insulating layer 87, corresponding to the center of the coil member 80, is exposed through the opening 58a. The etching mask 58 is formed of a metal, such as chromium (Cr).

Figure 13B:
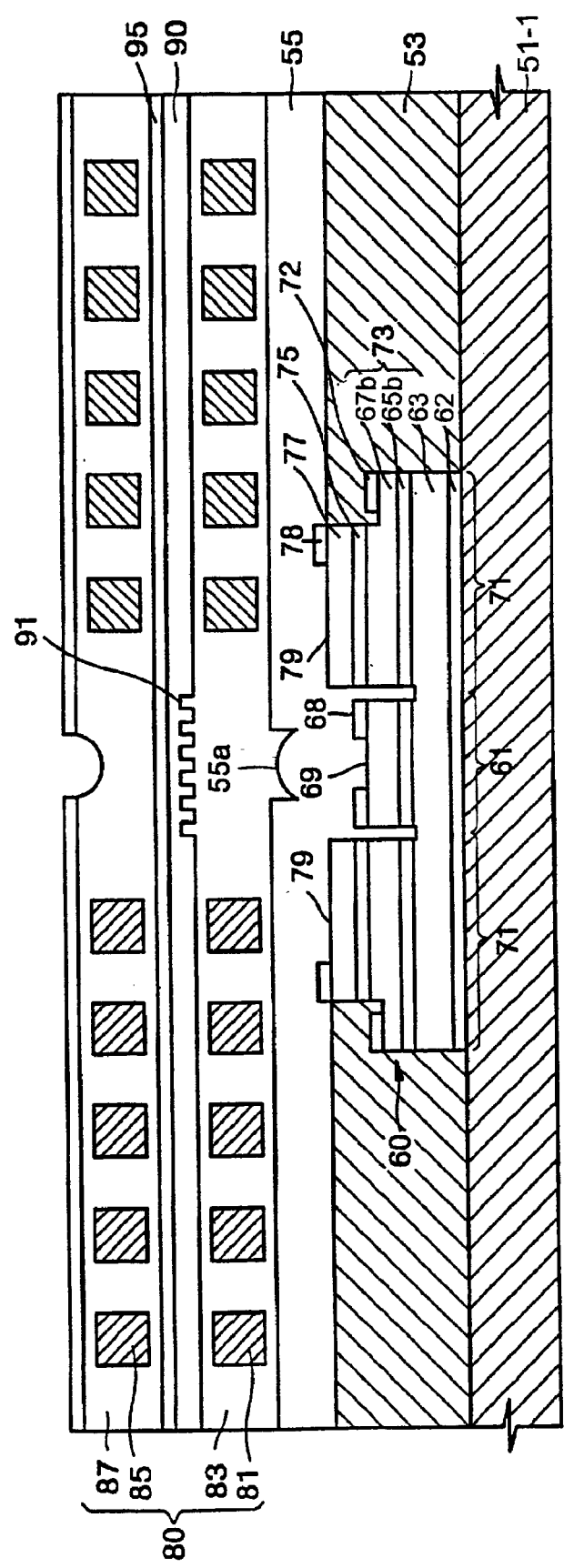
FIG. 13B illustrates etching a micro-lens in a surface of the coil member.
Figure 13C:
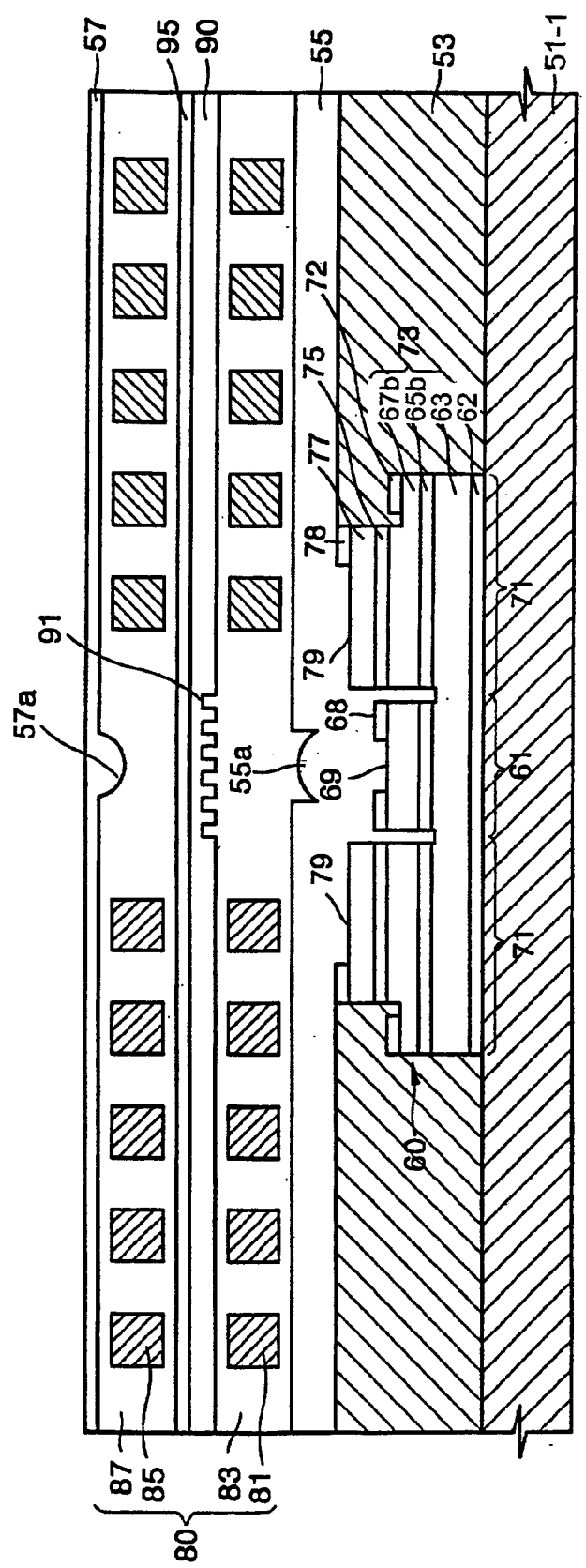
FIG. 13C illustrates removing the etching mask and coating a surface of the coil member with a dielectric material.

Next, as shown in FIG. 13B, the portion of the insulating layer 87 exposed through the opening 58a is etched in an etchant, for example, a polymer etchant, to form the second micro-lens 57a having concave curvature. Because of the small opening 58a, the exposed portion of the insulating layer 87 is isotropically etched, so that the resultant second micro-lens 57a has a semi-spherical concave curvature. Lastly, as shown in FIG. 13C, the etching mask 58 is removed from the insulating layer 87, and the resultant structure is coated with a dielectric material having a higher refractive index than the insulating layer 87 and excellent durability, such as SiN or $ZnSiO_2$, so that the second lens layer 57 having the second micro-lens 57a, which is a solid immersion lens formed in the insulating layer 87 with semi-spherical curvature, is completed. After the formation of the second lens layer 57 is completed, the surface of the second lens layer 57 is planarized by polishing, so that the optical head 50, as shown in FIG. 5, is obtained. Preferably, a plurality of optical heads having the above configuration are formed on a wafer by the above method and the wafer is cut to form individual optical heads, preferably after the second lens layer 57 is planarized and polished.

Figure 14:
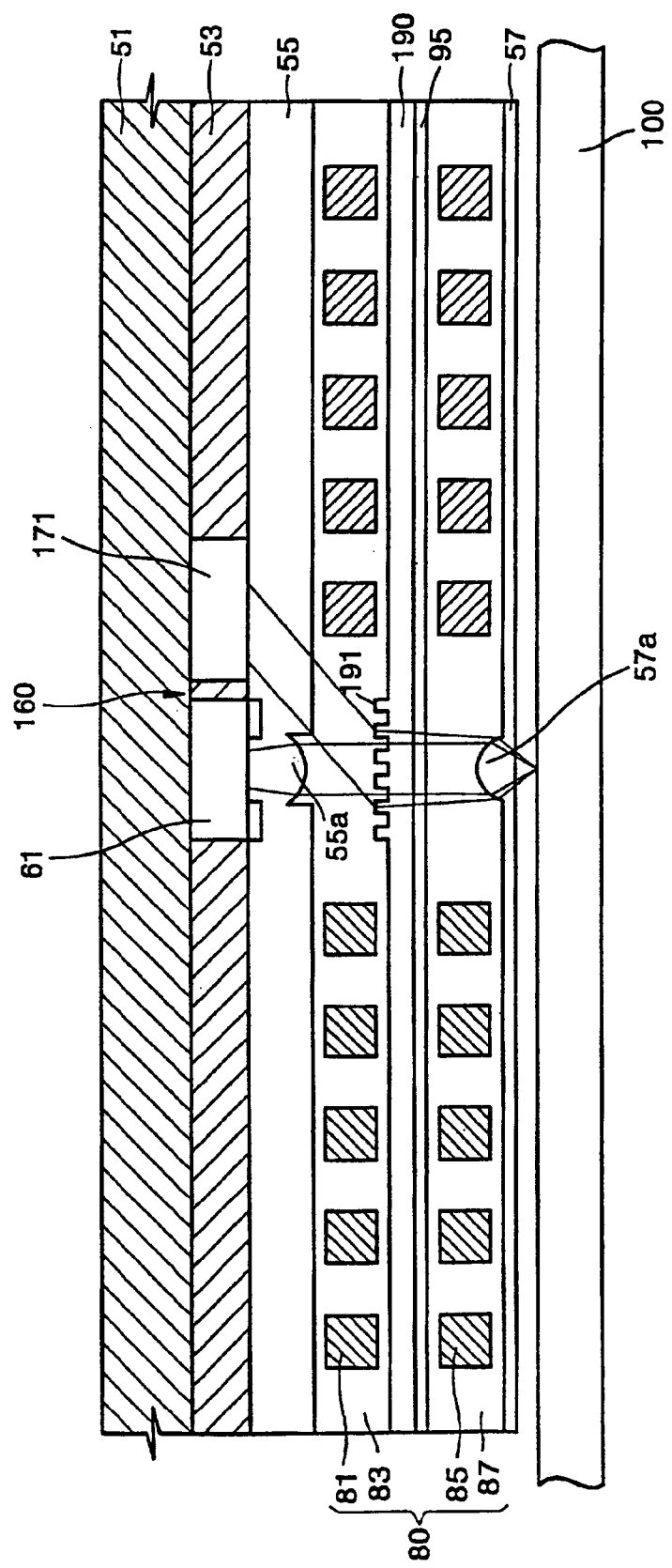
FIG. 14 is a schematic view of still another embodiment of the optical head according to the present invention.

FIG. 14 illustrates another embodiment of the optical head 50 for near-field recording and reproduction according to the present invention. The same elements as those of FIG. 5 are denoted with the same reference numerals. The present embodiment is characterized in that a photodetector 171 of a light device module 160 is arranged at one side of the VCSEL 61, and an optical path control layer 190 has a stripe hologram pattern 191 at the center thereof, such that the optical path control layer 190 diffracts the incident beam reflected from the recording medium 100 toward the photodetector 171. The photodetector 171 may have a conventional structure, or the same structure as the structure of the embodiment described with reference to FIG. 5.

The light device module 160 having the VCSEL 61 and the photodetector 171 can be directly deposited on the slider 51 by semiconductor manufacturing processes, or a completed light device module can be integrated on the slider 51. The structure and manufacture of the first lens layer 55, the coil member 80, the optical path control layer 190, the polarization changing layer 95 and the second lens layer 57 are the same as those of the previous embodiment described with reference to FIG. 5, and thus description of these elements will not be provided here.

As previously described, in the optical pickup for near-field recording and reproduction according to the present invention, the VCSEL and the photodetector are formed over the slider, and the lens layers, the optical path control layer and/or the coil member are directly deposited over the VCSEL and the photodetector by a thin film deposition technique. In other words, because the optical system for information recording and reproduction is combined with the slider, so that the optical head becomes small, unlike a conventional optical head adopting a slider and a large optical system, which are separated from each other. As a result, dynamic is characteristics of the optical head improve, thereby reducing the time required for searching for a target track. Thus, the optical head of the present invention is suitable for a micro information recording and reproducing system.

In the case where the coil member is adopted, the coil member and other elements can be simultaneously formed on the slider by thin film deposition, without need to form a conventional mesa structure. Thus, a step of attaching a coil member to the slider can be omitted, thereby simplifying the manufacturing process.

Furthermore, a plurality of optical heads having the above configuration can be integrated over a single wafer by thin film deposition, which enables mass production. The assembling process is also simplified. As a result, the optical head can be manufactured at low cost.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical head for near-field recording and reproduction, comprising:
   a slider which hovers above a recording medium by air dynamic pressure;
   a light device module formed on a surface of the slider which faces the recording medium, the light device module comprising:
      a vertical cavity surface emitting laser (VCSEL) which emits light toward the recording medium, and
      a photodetector which detects the light emitted from the VCSEL and then reflected by the recording medium;
   a first lens layer deposited on the light device module using a transparent material, the first lens layer comprising a first lens which condenses incident light at a portion corresponding to a light emitting portion of the VCSEL; and
   an optical path control layer having a hologram at the center thereof, which controls the traveling path of incident light such that the light incident from the VCSEL through the first lens layer travels toward the recording medium, and the light reflected by the recording medium travels toward the photodetector,
   wherein the VCSEL comprises:
      a doped first distributed Bragg reflector (DBR) formed by alternately stacking layers of semiconductor materials having different refractive indexes,
      an active layer formed on the first DBR, and
      a second DBR doped with a type opposite to the doping of the first DBR, the second DBR formed by alternatively stacking semiconductor materials having different refractive indexes, wherein the VCSEL emits the light through a window of the second DBR.

2. The optical head of claim 1, wherein:
   the hologram of the optical path control layer has a concentric pattern, and
   the photodetector has an annular shape, which surrounds the VCSEL, and is formed in combination with the VCSEL.

3. The optical head of claim 2, wherein the VCSEL further comprises:
   a first electrode between the slider and the first DBR, and
   a second electrode formed in a predetermined pattern on the second DBR to expose the window of the second DBR; and
   the photodetector comprises:
      a first semiconductor material layer at least a portion of which is separated a predetermined distance from the VCSEL,
      a second semiconductor material layer which absorbs light and is formed on the first semiconductor material layer,
      a third semiconductor material layer formed on the second semiconductor material layer,
      a first detecting electrode electrically connected to a portion of the first semiconductor material layer, and
      a second detecting electrode formed in a predetermined pattern on the third semiconductor material layer to expose a light receiving surface of the third semiconductor material layer.

4. The optical head of claim 3, wherein the first semiconductor material layer of the photodetector has the same structure as the combined layers of semiconductor material of the first and second DBRs of the VCSEL, and a portion of the first semiconductor material layer above a predetermined layer of the first DBR is separated from the VCSEL.

5. The optical head of claim 3, wherein the second semiconductor material layer of the photodetector is formed of substantially the same material as that used to form the active layer to have substantially the same thickness as the active layer, and the third semiconductor material layer of the photodetector is formed of substantially the same material as that used to form the first DBR to include a smaller number of layers than the first DBR.

6. The optical head of claim 1, wherein the hologram of the optical path control layer has a stripe pattern, and the photodetector is arranged at one side of the VCSEL.

7. The optical head of claim 1, wherein the first lens of the first lens layer is formed by diffusion-limited etching to have a predetermined curvature.

8. The optical head of claim 1, wherein the VCSEL emits the light having a wavelength of about 650 nm or 680 mn, and the first lens layer is formed of InGaP.

9. The optical head of claim 1, further comprising a second lens layer formed at a side of the optical control layer which faces the recording medium, the second lens layer formed of a material having a high refractive index and comprising a second lens for condensing incident light from the VCSEL.

10. The optical head of claim 9, wherein the second lens layer is formed of a material having a refractive index of about 2.1 or more.

11. The optical head of claim 1, further comprising:
    a coil member formed on the first lens layer, the coil member comprising:
       at least one coil layer having a spiral structure and a central opening, and
       at least one insulating layer which protects a respective one of the at least one coil layer and electrically insulates the adjacent portions of each respective coil layer, the insulating layer formed of a transparent material to allow transmission of light through the central opening of each coil layer, the coil member enabling the recording of information on the recording medium by magnetic field modulation.

12. The optical head of claim 11, wherein the hologram of the optical path control layer is a polarization hologram having a high transmittance with respect to light polarized in a first direction and a high diffraction efficiency with respect to the light polarized in a second direction, and the optical path control layer further comprises a polarization changing layer at the side of the optical path control layer which faces the recording medium, to change the polarization of incident light.

13. The optical head of claim 11, wherein a plurality of coil layers are formed and the optical path control layer is located between two of the plurality of coil layers.

14. A method of manufacturing an optical head for near-field recording and reproduction, comprising:
preparing a substrate;
forming a light device module on the substrate, the light device module comprising:
a vertical cavity surface emitting laser (VCSEL) which emits light, and
a photodetector which receives light incident after having been emitted from the VCSEL and reflected by the recording medium;
forming a first lens layer by depositing a light transmitting material over the light device module, the first lens layer having a first lens, which condenses incident light, at a portion corresponding to a light emitting portion of the VCSEL; and
forming an optical path control layer having a hologram at the center thereof, to transmit light incident from the VCSEL through the first lens layer toward the recording medium, and to transmit light incident after having been reflected from the recording medium toward the photodetector.

15. The method of claim 14, wherein the forming of the first lens layer having the first lens comprises:
depositing the first lens layer over the light device module using the transparent material which transmits the light emitted from the VCSEL;
forming an etching mask having an opening over the first lens layer, the opening being at a portion corresponding to the light emitting portion of the VCSEL;
immersing the first lens layer with the etching mask in a chemical etching solution, such that a portion of the first lens layer exposed through the opening is etched by diffusion-limited etching, thereby resulting in the first lens with curvature; and
removing the etching mask.

16. The method of claim 14, further comprising:
forming the hologram of the optical path control layer to have a concentric pattern,
forming the photodetector to have an annular shape surrounding the VCSEL; and
forming the photodetector in combination with the VCSEL.

17. The method of claim 16, wherein the forming of the light device module comprises:
forming a first electrode on the substrate;
forming a stack of semiconductor material layers for the VCSEL and a first semiconductor material layer for the photodetector which are partially separated by a predetermined distance from each other, each of the stack for the VCSEL and the first semiconductor material layer comprising a doped first distributed Bragg reflector (DBR), an active layer and a doped second DBR, doped oppositely of the first DBR, the first DBR and the second DBR being stacked in sequence, each of the first and second DBRs including a stack of semiconductor material layers alternately having different refractive indexes, wherein the stack for the VCSEL and the first semiconductor material layer share a portion of the first DBR;
forming a second semiconductor material layer to absorb incident light on the second DBR of the photodetector surrounding the VCSEL;
forming a third semiconductor material layer doped with the same type as the first DBR on the second semiconductor material layer;
etching the third and second semiconductor layers and the second DBR of the photodetector to a predetermined depth which extends a portion of the second DBR, such that the second DBR of the photodetector is partially exposed;
forming a second electrode on the second DBR of the VCSEL, exclusive of a window on the second DBR;
forming a first detecting electrode on the exposed portion of the second DBR of the photodetector; and
forming a second detecting electrode on the third semiconductor material layer to expose a light receiving surface of the third semiconductor material layer.

18. The method of claim 17, wherein the second semiconductor material layer is formed of substantially the same material as that used to form the active layer to have substantially the same thickness as the active layer, and the third semiconductor material layer is formed of substantially the same material as that used to form the first DBR to include a smaller number of layers than the first DBR.

19. The method of claim 14, further comprising forming a coil member over the first lens layer, the coil member comprising at lease one coil layer with a spiral structure and a central opening, and an insulating layer formed of a transparent material to allow transmission of light through the central opening of the coil layer, to protect the coil layer and to electrically insulate the adjacent portions of the coil layer.

20. The method of claim 19, wherein the forming of the coil member comprises:
forming a plurality of coil layers; and
forming the optical path control layer between the coil layers.

21. The method of claim 19, wherein the forming of the optical path control layer comprises forming the hologram as a polarization hologram and the method of manufacturing an optical head further comprises forming a polarization converting layer at the side of the optical path control layer which faces the recording medium, to change the polarization of incident light.

22. The method of claim 19, further comprising:
forming an etching mask having an opening over the coil member, such that a central area of the insulating layer is exposed through the opening;
etching the portion of the insulating layer exposed through the opening to form a second lens having curvature;
removing the etching mask; and
forming a second lens layer over the insulating layer using a material having a higher refractive index than the refractive index of the insulating layer.

23. The method of claim 22, wherein the opening of the etching mask is small enough to apply isotropic etching to the exposed portion of the insulating layer.

24. An optical head for recording and/or reproduction of information on a recording medium, the optical head comprising:
a substrate;
a vertical cavity surface emitting laser (VCSEL,) having a plurality of semiconductor material layers formed on the substrate and which emits light along an optical axis transverse to a surface of the substrate;
a photodetector having a plurality of layers of semiconductor material formed on the substrate and sharing at least one semiconductor material layer with the VCSEL;
an optical system formed over the VCSEL and the photodetector which focuses the emitted light onto the recording medium and transmits light reflected from the recording medium to the photodetector.

25. The optical head of claim 24 wherein the photodetector surrounds the optical axis.

26. The optical head of claim 24, wherein the photodetector is offset from the optical axis along the surface of the substrate.

27. The optical head of claim 24, wherein the VCSEL comprises:
a doped first distributed Bragg reflector (DBR) formed by alternately stacking layers of semiconductor material having different refractive indexes,
an active layer formed on the first DBR, and
a second DBR doped oppositely of the first DBR and formed by alternately stacking layers of semiconductor materials having different refractive indexes.

28. The optical head of claim 27, wherein the VCSEL and the photodetector share the semiconductor layers comprising the first DBR.

29. The optical head of claim 24, wherein the photodetector further comprises:
a second active layer formed on the at least one semiconductor material layer which is shared with the VCSEL; and
a second plurality of layers of semiconductor material formed on the second active layer.

30. The optical head of claim 27, wherein the plurality of layers of the photodetector comprises a number of layers of semiconductor material corresponding to the number of layers of semiconductor material of the VCSEL.

31. The optical head of claim 24, wherein the optical system is formed by thin film deposition.

32. The optical head of claim 24, wherein the optical system comprises:
a first lens layer formed on the VCSEL, the first lens layer having a first micro-lens formed thereon which condenses the light emitted by the VCSEL.

33. The optical head of claim 24, where in the micro-lens is formed by etching the formed lens layer.

34. The optical head of claim 32, further comprising:
a second lens layer having a second micro-lens formed thereon which focuses the emitted light on the recording medium.

35. The optical head of claim 34, further comprising a region of transparent material which spaces apart the first micro lens and second micro-lens.

36. The optical head of claim 35, further comprising a control layer having a hologram, the hologram redirecting light reflected from the recording medium to the photodetector.

37. The optical head of claim 36, wherein the photodetector surrounds the VCSEL and the hologram has a concentric pattern.

38. The optical head of claim 35, wherein the photodetector is offset from the optical axis and the hologram has a stripe pattern.

39. A method of making an optical head for recording and/or reproduction of information on a recording medium, the method comprising:
providing a substrate;
forming a vertical cavity surface emitting laser (VCSEL) on the substrate, to emit light along an optical axis transverse to a surface of the substrate;
forming a photodetector on the substrate so that the photodetector and the VCSEL share at least one semiconductor layer; and
forming an optical system over the VCSEL and the photodetector which focuses the emitted light onto the recording medium and transmits light reflected from the recording medium to the photodetector.

40. The method of claim 39, wherein the forming of the VCSEL comprises:
alternately stacking layers of semiconductor material having different refractive indexes on the substrate to form a doped first distributed Bragg reflector (DBR);
forming a first active layer on the first DBR, and
alternately stacking additional layers of semiconductor material having different refractive indexes on the first active layer, to form a second doped DBR, the doping of the second DBR being opposite to the doping of the first DBR.

41. The method of claim 40, wherein the forming of the photodetector comprises:
forming a second active layer on a predetermined area of the second DBR;
forming a third active layer on the second active layer; and
etching the second DBR and the first, second and third active layers to form a trench having a depth which extends into the first DBR, to divide the second DBR into first and second portions, separating the photodetector from the VCSEL.

42. The method of claim 39, wherein the forming of the optical system comprises:
forming a first lens layer on the VCSEL and the photodetector;
forming a mask on the first lens layer, the mask having a central opening which surrounds the optical axis; and
etching the first lens layer within the central opening of the mask, to form a first micro-lens.

43. The method of claim 42, wherein the forming of the optical system further comprises:
forming a layer of transparent material on the first microlens, the transparent material having a predetermined thickness along the optical axis;
forming another mask on the on a surface of the layer of transparent material, the another mask having another central opening which surrounds the optical axis;
etching the transparent material within the central opening of the another mask, to form a cavity having a shape of a second micro-lens; and
forming a second lens layer on the layer of transparent material, the material forming the second lens layer being shaped by the cavity, to form the second microlens.

44. The method of claim 42, wherein the forming of the optical system further comprises:

forming a layer of transparent material on the first micro-lens, the transparent material having a predetermined thickness along the optical axis;

forming an optical control layer on the transparent material, the optical control layer comprising a hologram;

forming another layer of transparent material on the first micro-lens, the transparent material having another predetermined thickness along the optical axis;

forming another mask on a surface of the another layer of transparent material, the another mask having another central opening which surrounds the optical axis;

etching the another layer of transparent material within the another central opening of the another mask, to form a cavity having a shape of a second micro-lens; and forming a second lens layer on the another layer of transparent material, the material forming the second lens layer being shaped by the cavity, to form the second micro-lens.

45. The method of claim 44 wherein the forming of the control layer comprises forming the hologram to have a concentric pattern.

46. The method of claim 44 wherein the forming of the control layer comprises forming the hologram to have a stripe pattern.

47. The method of claim 44, wherein the method further comprises forming a coil within the layer of transparent material.

48. The method of claim 44, wherein the method further comprises forming a coil within the another layer of transparent material.

49. An optical head for recording and/or reproduction of information on a recording medium, the optical head comprising:

a substrate;

a vertical cavity surface emitting laser (VCSEL) having a plurality of semiconductor layers formed on the substrate and which emits light along an optical axis transverse to a surface of the substrate;

a photodetector formed on the substrate and sharing at least one semiconductor layer with the VCSEL;

an optical system formed over the VCSEL which focuses the emitted light onto the recording medium.

50. The method of claim 49, wherein the optical system comprises a micro lens formed by diffusion-limited etching.

51. The method of claim 49, wherein the optical system comprises a micro lens formed by etching using a solution containing bromine.

52. An optical head for recording and/or reproduction of information on a recording medium, the optical head comprising:

a substrate;

a vertical cavity surface emitting laser (VCSEL) formed on the substrate;

a photodetector formed on the substrate;

an optical system formed over the VCSEL by thin film deposition, wherein the photodetector surrounds the VCSEL.

53. An optical head for recording and/or reproduction of information on a recording medium, the optical head comprising:

a substrate;

a vertical cavity surface emitting laser (VCSEL) formed on the substrate;

a photodetector formed on the substrate;

an optical sytem formed over the VCSEL by thin film deposition, wherein:

the VCSEL emits light along a optical axis along the surface of the substate.

54. The optical head of claim 53 wherein the photodetector surrounds the VCSEL.

55. The optical head of claim 53, wherein:

the VCSEL emits light along a optical axis transverse to a surface of the substrate; and the photodetector is offset from the optical axis along the surface of the substrate.

* * * * *

UNITED STATES PATENT AND TRADEMARK OFFICE
CERTIFICATE OF CORRECTION

| | | |
|---|---|---|
| PATENT NO. | : 7,057,999 B2 | Page 1 of 1 |
| APPLICATION NO. | : 09/764158 | |
| DATED | : June 6, 2006 | |
| INVENTOR(S) | : Young-min Cheong et al. | |

It is certified that error appears in the above-identified patent and that said Letters Patent is hereby corrected as shown below:

Column 14, line 43, change "680 mn" to -- 680 nm --

Column 16, line 32, change "lease" to -- least --

Column 20, lines 30-31 change
"the VCSEL emits light along a optical axis along the surface of the substrate" to
-- the VCSEL emits light along a optical axis transverse to a surface of the substrate; and the photodetector is offset from the optical axis along the surface of the substrate. --

Column 20, lines 32-38 delete "54. The optical head of claim 53, wherein the photdetector surrounds the VCSEL.  55. The optical head of claim 53, wherein: the VCSEL emits light along a optical axis transverse to a surface of the substrate; and the photodetector is offset from the optical axis along the surface of the substrate."

Signed and Sealed this

Third Day of April, 2007

JON W. DUDAS
*Director of the United States Patent and Trademark Office*